United States Patent
Kennedy

[19]

[11] Patent Number: 5,832,513
[45] Date of Patent: Nov. 3, 1998

[54] DETECTING SIGNIFICANT FILE SYSTEM ALTERATIONS DURING EXECUTION OF A STORAGE MEDIA SOFTWARE UTILITY

[75] Inventor: Mark Kevin Kennedy, Redondo Beach, Calif.

[73] Assignee: Symantec Corporation, Cupertino, Calif.

[21] Appl. No.: 658,172

[22] Filed: Jun. 4, 1996

[51] Int. Cl.⁶ .................................................. G06F 17/30
[52] U.S. Cl. ............................ 707/202; 707/200; 707/1; 395/670
[58] Field of Search ................................ 395/60, 61, 62, 395/670; 707/202, 200, 1

[56] References Cited

U.S. PATENT DOCUMENTS

| | | | |
|---|---|---|---|
| 5,237,681 | 8/1993 | Kagan et al. | 395/615 |
| 5,313,647 | 5/1994 | Kaufman et al. | 395/672 |
| 5,347,632 | 9/1994 | Fileppo et al. | 395/200.32 |
| 5,361,359 | 11/1994 | Tajalli et al. | 395/186 |
| 5,423,034 | 6/1995 | Cohen-Levy et al. | 395/610 |
| 5,479,656 | 12/1995 | Rawlings, III | 395/616 |
| 5,504,883 | 4/1996 | Coverston et al. | 395/618 |
| 5,544,360 | 8/1996 | Lewak et al. | 395/601 |
| 5,551,020 | 8/1996 | Flax et al. | 395/612 |
| 5,553,235 | 9/1996 | Chen et al. | 395/182.18 |
| 5,574,907 | 11/1996 | Jernigan, IV et al. | 395/601 |
| 5,625,821 | 4/1997 | Record et al. | 395/670 |
| 5,652,865 | 7/1997 | Rawlings, III | 395/497.02 |

*Primary Examiner*—Wayne Amsbury
*Attorney, Agent, or Firm*—Fliesler, Dubb, Meyer & Lovejoy LLP

[57] ABSTRACT

A method for handling a file system write to a media during execution of a software utility for the media wherein the software utility reads at least one file structure from the media and storing the file structure into a local copy of the file structure. A write monitor driver routine detects the file system write to the media and logs a set of parameters for the file system write. The software utility retrieves the log and determines whether the parameters indicate that the file system write affects the local copy of the file structure and whether a restart is required.

28 Claims, 6 Drawing Sheets

| (FAT) FILE ALLOCATION TABLE | DIRECTORY STRUCTURE (DIR) | DIRECTORY 100 | DIRECTORY 101 | FILE A 102 | FILE A 103 | FILE A 104 | FILE A 105 |
|---|---|---|---|---|---|---|---|
| 106 DIRECTORY | 107 FILE A | 108 FILE B | 109 FILE B | 110 FILE B | 111 DIRECTORY | 112 FILE A | 113 DIRECTORY | 114 FILE A |
| 115 FILE A CLONE | 116 FILE A CLONE | 117 FILE A CLONE | 118 FILE A CLONE | 119 FILE A CLONE | 120 FILE A CLONE | 121 FILE A CLONE | 122 | 123 |

FIG. 4

DETECTING SIGNIFICANT FILE SYSTEM ALTERATIONS DURING EXECUTION OF A STORAGE MEDIA SOFTWARE UTILITY

BACKGROUND OF THE INVENTION

1. Field of Invention

The present invention pertains to the fields of computer systems and software. More particularly, this invention relates to the handling of file system writes to a storage media during utility operations on the storage media.

2. Art Background

Prior computer systems such as personal computer systems typically include one or more mass storage subsystems. Such mass storage subsystems may include, for example, rotating media disk drives as well as solid state media such as flash memory. In addition, such computer systems typically include software utilities that perform maintenance and other specialized operations for such mass storage subsystems.

For example, such software utilities commonly perform file defragmentation operations on the rotating media of the disk drive or file defragmentation operations on a solid state memory. Such software utilities also commonly perform file recovery operations and error detection operations for such mass storage subsystems.

Typically, application programs executing on such a computer system access such mass storage subsystems by invoking file system services provided by an operating system. Such file system services usually enable application programs to create and to read and write files on the mass storage media. In addition, user interface tasks provided by the operating system usually employ such file system services.

On the other hand, storage media software utilities typically perform direct reads and writes to the storage media and bypass the file system services provided by the operating system. Such a storage media software utility usually reads file structures and file data from the mass storage media and stores local copies of the structures and data in memory. Such a software utility usually performs some user selected maintenance operation which can result in modification of the file structures and rearrangement of files on the disk media.

In addition, some more recently evolved operating systems for personal computers provide multithreaded, preemptive multitasking of individual application programs including such software utilities. One such recently evolved operating system is Windows 95 which is available from Microsoft Corporation of Redmond, Wash.

In such a preemptively multitasked, multithreaded execution environment, the file structures or data maintained by a storage media software utility may become out of sync with the contents of the storage media. For example, a user interface task or application program typically invokes the file system services of the operating system to perform file system writes to the storage media. Such file system write may occur after the software utility reads file structures and data from storage media and before the software utility writes back to the storage media.

Prior software utilities usually employ operating system services to detect such file system writes to the storage media. For example, Windows 95 provides a storage media locking mechanism. Typically, such a locking mechanism enables the software utilities to poll for writes undertaken by the file system services of the operating system. In response to a poll from the software utility, the locking mechanism provided by Windows 95 returns a true/false indication of whether a file system write operation to the storage media has occurred.

Prior software utilities typically perform a restart if such a file system write is detected. Typically, the directory structure and file information contained in local memory is discarded and then reread upon the restart. Such a restart by a software utility is typically based upon an assumption that the detected file system write was targeted for an area of the storage media that renders stale the local memory copy of that area.

Unfortunately, such restarts typically slow the overall operation of the software utility, even for file system writes to the storage media that do not conflict with the local memory structures maintained by the software utility. In addition, such restarts in response to inconsequential file system writes may be perceived by the user as a deficiency in the software utility.

SUMMARY AND OBJECTS OF THE INVENTION

One object of the present invention is to improve the efficiency of software utilities for storage media in a computer system.

Another object of the present invention is to eliminate unnecessary restarts in software utilities caused by inconsequential writes to the storage media.

A further object of the present invention is to eliminate unnecessary restarts of a disk defragmentation utility for the computer system.

These and other objects are provided by a method for handling a file system write to a media during execution of a software utility for the media. The software utility reads at least one file structure from the media and stores the file structure into a local copy of the file structure. A write monitor driver routine detects the file system write to the media and logs a set of parameters for the file system write. The software utility retrieves the log and determines whether the parameters indicate that the file system write affects the local copy of the file structure and whether a restart is required.

Other objects, features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which:

FIG. 4 represents an example layout of information for a disk volume contained on a disk drive;

DETAILED DESCRIPTION

Figure 1:
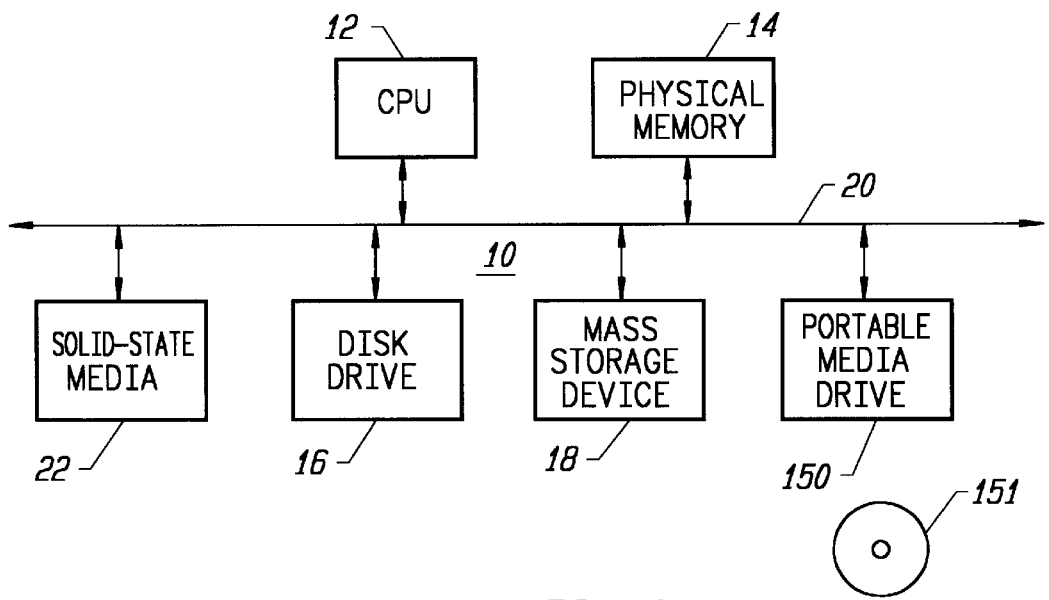
FIG. 1 illustrates the computer system which includes a variety of storage media that are maintained by corresponding software utilities.

FIG. 1 illustrates the computer system 10 for one embodiment. The computer system 10 includes a central processing unit (CPU) 12, a physical memory 14, a disk drive 16, a solid-state media 22, and a mass storage device 18.

The computer system 10 also includes a portable media drive 150 that accepts a portable media 151 containing software and related information. The portable media 151 may comprise, for example, a CD-ROM or a floppy disk. The application routines and driver routines disclosed herein may be provided via the portable media 151 or a wide-variety of other computer readable storage media.

For this embodiment, the CPU 12 communicates with the disk drive 16, the solid-state media 22, the portable media drive 150, and the mass storage device 18 via a host bus 20. However, for other embodiments, the CPU 12 communicates with peripheral devices such as the disk drive 16 and the mass storage device 18 and the solid-state media 22 through one or more of a variety of input/output interface circuitry including bus bridge circuits that enable communication between the host bus 20 and a variety of standardized peripheral buses.

The computer system 10 implements a file system structure for the disk drive 16, the mass storage device 18, the portable media drive 150, and the solid state media 22. The disk drive 16 provides a rotating disk magnetic media mass storage for large scale code and data storage for the computer system 10. In one embodiment, the solid state media 22 comprises the flash memory subsystem. The mass storage device 18 represents a variety of other mass storage media.

Figure 2:
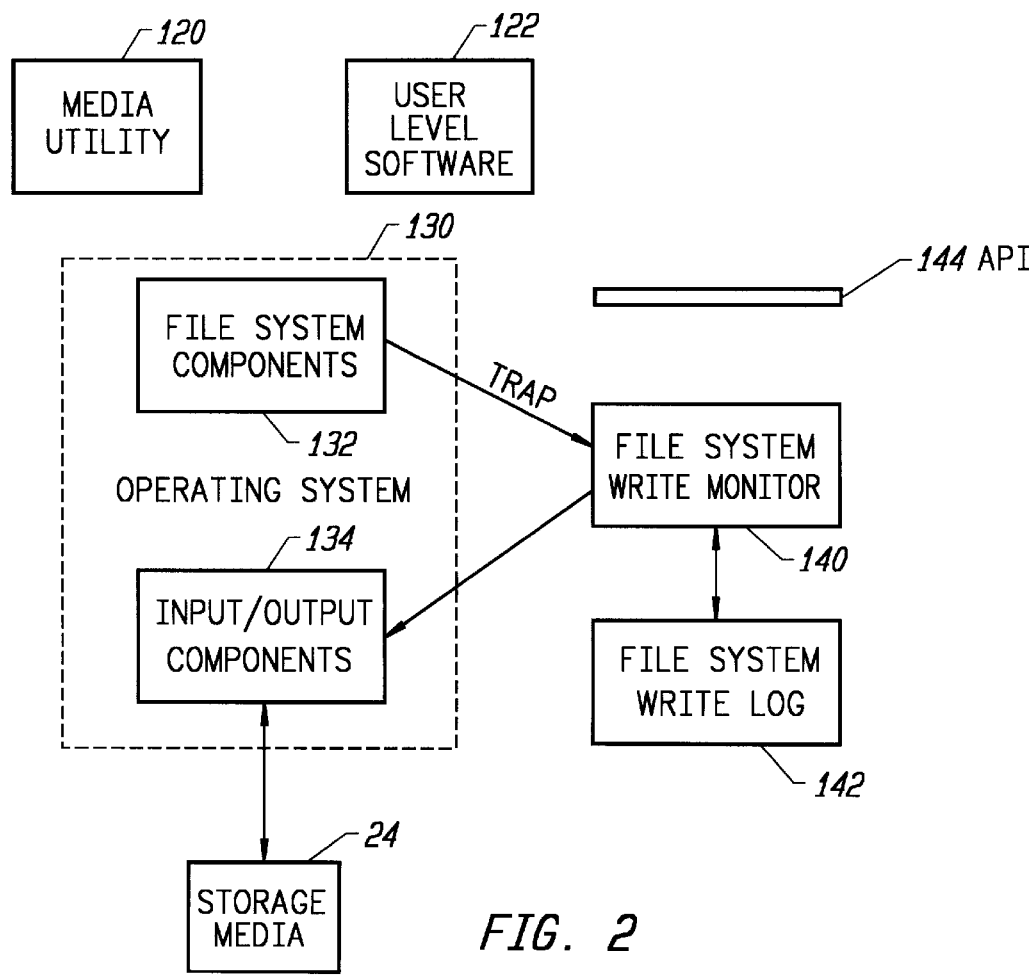
FIG. 2 illustrates a set of software mechanisms for the computer system that provide detection and handling of significant file system writes during media utility operations.

FIG. 2 illustrates a set of software mechanisms for the computer system 10 that provide detection and handling of significant file system writes during media utility operations. The computer system 10 executes an operating system 130 that maintains a file system on the disk drive 16, the mass storage device 18, and the solid state media 22. For this illustration, a storage media 24 represents either of the disk drive 16, the mass storage device 18, or the solid state media 22. The computer system 10 executes a media utility 120 that in combination with a file system write monitor 140 detects significant file system alterations to the storage media 24.

The operating system 130 includes a set of file system components 132 and a set of input/output components 134. The file system components 132 provide a set of file system services to application programs and other software elements executing on the computer system 10 which are represented by a set of user level software 122. The input/output components 134 include a set of input/output driver routines that enable the file system components 132 and the media utility 120 to perform direct reads and direct writes to the storage media 24.

While the user level software 122 accesses files on the storage media 24 through the file system components 132, the media utility 120 accesses the storage media 24 directly through the input/output components 134. The media utility 120 reads directory and file allocation structures and file data from the storage media 24 via the input/output components 134 and maintains local versions of the directory and file allocation structures and file data in the physical memory 14.

The media utility 120 performs utility-specific functions on the directory and file allocation structures and file data copied into the physical memory 14 and writes the local copies back to the storage media 24. Such functions may include, for example, file defragmentation operations as well as file recovery operations and other types of storage media scanning operations.

The file system write monitor 140 detects the file system writes to the storage system hardware 24 by trapping file system write commands generated by the file system components 132. The file system write monitor 140 logs the file system writes in a file system write log 142. The file system write monitor 140 then passes the trapped file system write commands to the input/output components 134.

The media utility 120 periodically polls the file system write monitor 140 through the an application programming interface (API) 144 to retrieve any information contained in the file system write log 142. The media utility 120 retrieves the information from the file system write log 142 and determines a method of handling the logged file system writes. The media utility 120 classifies each logged file system write and based upon the classification determines whether each particular logged file system write is inconsequential or can be readily integrated with the functions of the media utility 120 or requires a restart.

Figure 3:
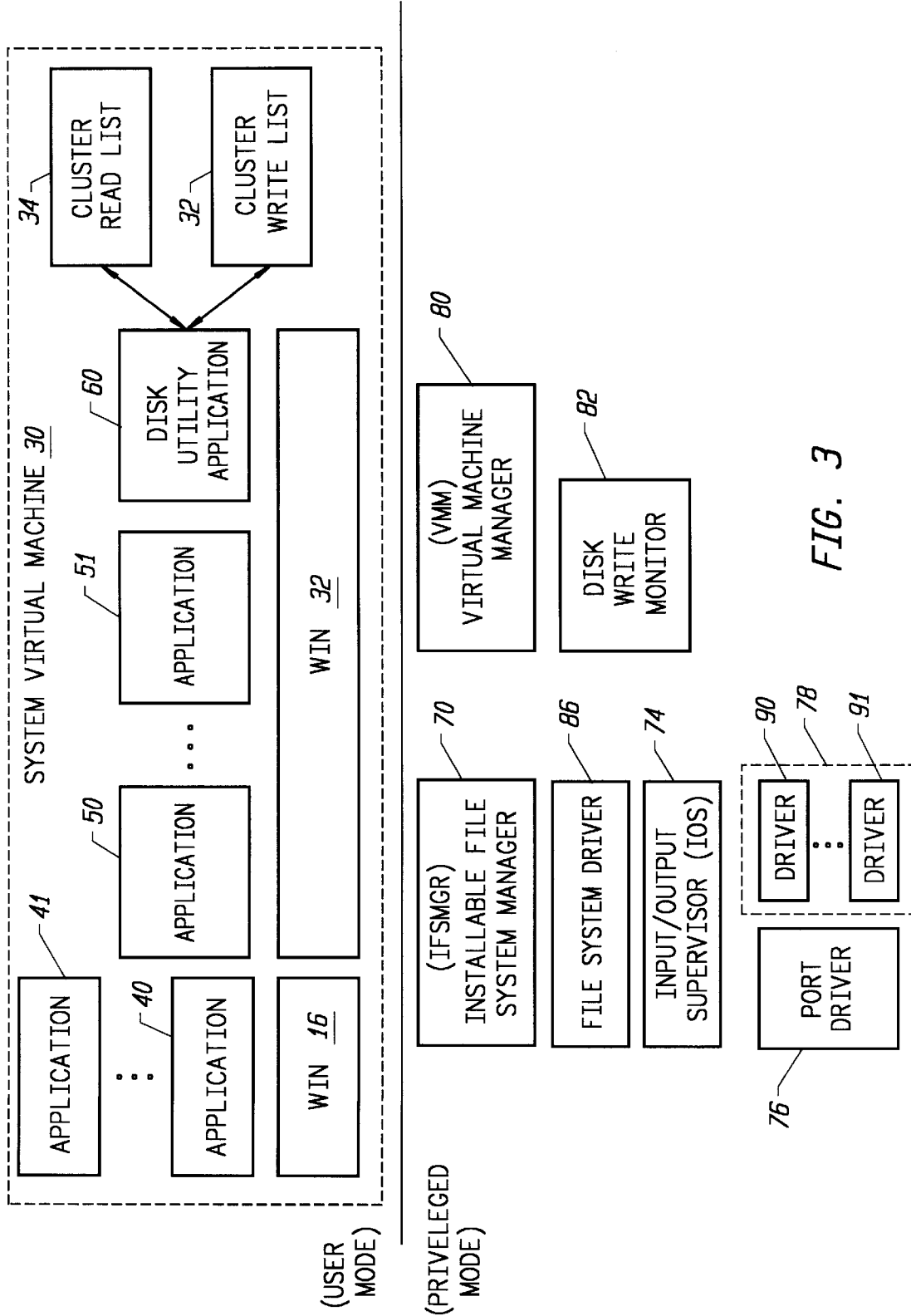
FIG. 3 provides a detailed software architecture of the computer system in one embodiment.

FIG. 3 illustrates a software architecture of the computer system 10 for one embodiment. The software architecture of the computer system 10 is generally divided into application programs that execute in the Ring 3 user mode of the CPU 12 and operating system components that execute in the Ring 0 privileged mode of the CPU 12. The software architecture shown generally illustrates portions of the Windows 95 operating system model.

The application programs executing in the user mode of the CPU 12 include a virtual machine manager 80 which executes in the privilege mode of the CPU 12 preemptively multitasks set of virtual machines including a virtual machine 30 which is referred to as the system virtual machine 30. The system virtual machine 30 includes a 16 bit window subsystem (WIN16) that enables execution of application programs written to conform to 16 bit Microsoft Windows such as application programs 40–41. The virtual machine 30 also includes a 32 bit windows subsystem (WIN32) that enables execution of application programs compatible with 32 bit Microsoft Windows including applications 50–51 and a disk utility application 60.

In this embodiment, the functionality of the file system write monitor 140 and the file system write log 142 are implemented in a disk write monitor 82. The disk utility application 60 is an application program for the WIN 32 subsystem that optimizes the performance of the disk drive 16 and therefore the computer system 10 by defragmenting files on the disk media of the disk drive 16. The disk utility application 60 directly reads media areas known as clusters from the disk drive 16 and logs the corresponding cluster identifiers in a cluster read list 34. In addition, the disk utility application 60 directly writes clusters on the disk drive 16 and logs the corresponding cluster identifiers in a cluster write list 32.

The operating system 130 for the computer system 10 maintains files on the disk drive 16 using a set of software elements 70–78. The software elements 70–78 are each implemented as virtual device drivers under Windows 95 and are arranged to present to a driver model to the virtual machine manager 80.

The installable file system manager 70 maintains an abstraction of the computer system 10 file system and communicates with a file system driver 86 that enables reading and writing of individual sectors of the disk drive 16. The file system driver 86 maintains a file system structure for the computer system 10 including a file allocation table and a directory structure on the disk drive 16. For one embodiment, the file system driver 86 maintains a virtual file allocation table (VFAT) file structure.

The file system driver 86 transfers information to and from the disk drive 16 through an input/output supervisor 74. The input/output supervisor (IOS) 74 provides IOS services that in turn communicate with the disk drive 16 hardware through either a monolithic port driver 76 or a device driver stack 78. The device driver stack 78 implements a stack of device driver calling routines 90–91.

FIG. 4 represents an example layout of information for a disk volume contained on the disk drive 16. The file system driver 86 logically divides the storage media of the disk drive 16 into a series of clusters. For purposes of this illustration, only the clusters 100–123 are shown.

For one embodiment, the disk drive 16 contains a file allocation table (FAT) and a directory structure (DIR) which provide the file system structure for a logical volume. The directory structure stores starting cluster numbers for individual files on the logical volume and the file allocation table provides a link list of cluster numbers that enable the file system driver 86, in one embodiment VFAT, to properly locate individual files on the disk drive 16.

An example set of files A–C is shown wherein file A is a fragmented file that is stored in the clusters 102–105, 107, 112, an 114 of the disk media of the disk drive 16. The disk utility application 60 defragments the file A by copying or cloning the clusters 102–105, 107, 112, an 114 over to a series of contiguous clusters, in this example, clusters 115–121 of the disk media of the disk drive 16.

During cloning, the disk utility application 60 reads the clusters 102–105, 107, 112, an 114 from the disk media of the disk drive 16 into local copes in the physical memory 14 and logs the cluster identifiers 102–105, 107, 112, and 114 into the cluster read list 34. The disk utility application 60 writes the local copies of the clusters 102–105, 107, 112, and 114 from the physical memory 14 to the contiguous clusters 115–121 of the disk media and logs the cluster identifiers 115–121 into the cluster write list 32. Thereafter, the disk utility 60 updates the file allocation table and the directory structure to reflect the new cluster locations of the file A.

The disk utility application 60 obtains the assistance of the disk write monitor 82 which executes in the privileged mode of the CPU 12. The disk utility application 60 dynamically loads the disk write monitor 82 into the physical memory 14 as needed. For an embodiment under Windows 95, the disk write monitor 82 is a linear executable file that the operating system loader marks as non-pageable. The linear page lock of the disk write monitor 82 prevents preemption during certain atomic operations of the disk write monitor 82. The disk write monitor 82 is installed as a virtual device driver and is accessed by the disk utility application 60 through WIN 32 device I/O control (DIOcontrol) calls.

Figure 5:
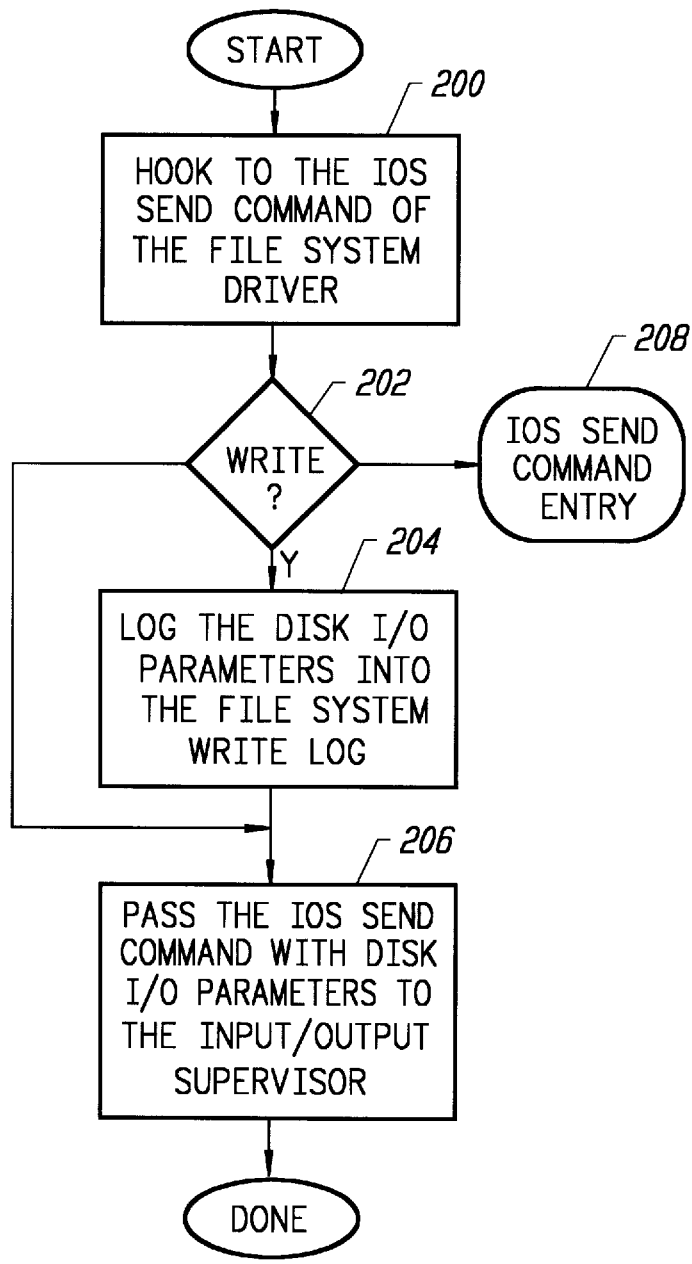
FIG. 5 illustrates the functions of the disk write monitor which traps file system writes.

FIG. 5 illustrates the functions of the disk write monitor 82. Upon entry at block 200, the disk write monitor 82 hooks to the IOS send command which is generated by the file system driver 86 and is normally serviced by the input/output supervisor 74.

For one embodiment, the operating system Windows 95 provides a utility that enables virtual device drivers such as the disk write monitor 82 to hook individual services of drivers such as the input/output supervisor 74. The virtual machine manager 80 provides a hook-device-service function that enables the disk write monitor 82 to trap a particular service provided by the input/output supervisor 74, in this case the IOS send command. The hook-device-service function provided by the virtual machine manager 80 inserts a run-time calling address provided by the disk write monitor 82 with the hook-device-service function call into a dispatch table maintained by the virtual machine manager 80. This dispatch table generally includes a list of device drivers and associated services along with dispatch addresses to the appropriate device driver services.

The hook-device-service function provided by the virtual machine manager 80 also returns to the disk write monitor 82 the displaced address for the handler of the IOS send command in the input/output supervisor 74. The virtual device driver 82 saves this displaced address to later pass on the trapped IOS send command and associated parameters to the input/output supervisor 74.

For another embodiment, the disk write monitor 82 inserts itself into the calling sequence of the device driver stack 78. In this embodiment, the disk write monitor 82 imitates the device driver interface (DDI) of one of the device drivers in the device driver stack 78. Such an embodiment offers the advantage that only accesses to the disk drive 16 are trapped rather than all accesses routed through the IOS send command of the input/output supervisor 74.

After the installation of the hook at block 200, any IOS send command from the file system driver 86 is trapped to the disk write monitor 82 according to the address provided by the disk write monitor 82 with the hook-device-service call. Each trapped IOS send command 208 is directed to decision block 202 of the disk write monitor 82. If the parameters associated with the trapped IOS send command 208 indicate a write to the disk drive 16, then control proceeds to block 204. Otherwise, control proceeds to block 206 to pass on the trapped IOS send command 208 to the input/output supervisor 74.

At block 204, the disk write monitor 82 logs the disk IO parameters specified by the trapped IOS send command into the file system write log 142. For one embodiment, the file system driver 86 passes a set of disk I/O parameters to the input/output supervisor 74 with the IOS send command. The parameters specify whether the IOS send command is a write and also specify and area of the disk media of the disk drive 16 for the write. The area of the disk media may be specified by a sector number and a delta value or block length offset for that sector.

Thereafter at block 206, the disk write monitor 82 passes on the IOS send command including the disk I/O parameters to the input/output supervisor 74 using the original IOS send command dispatch address obtained through the hook-device-service function.

Figure 6:
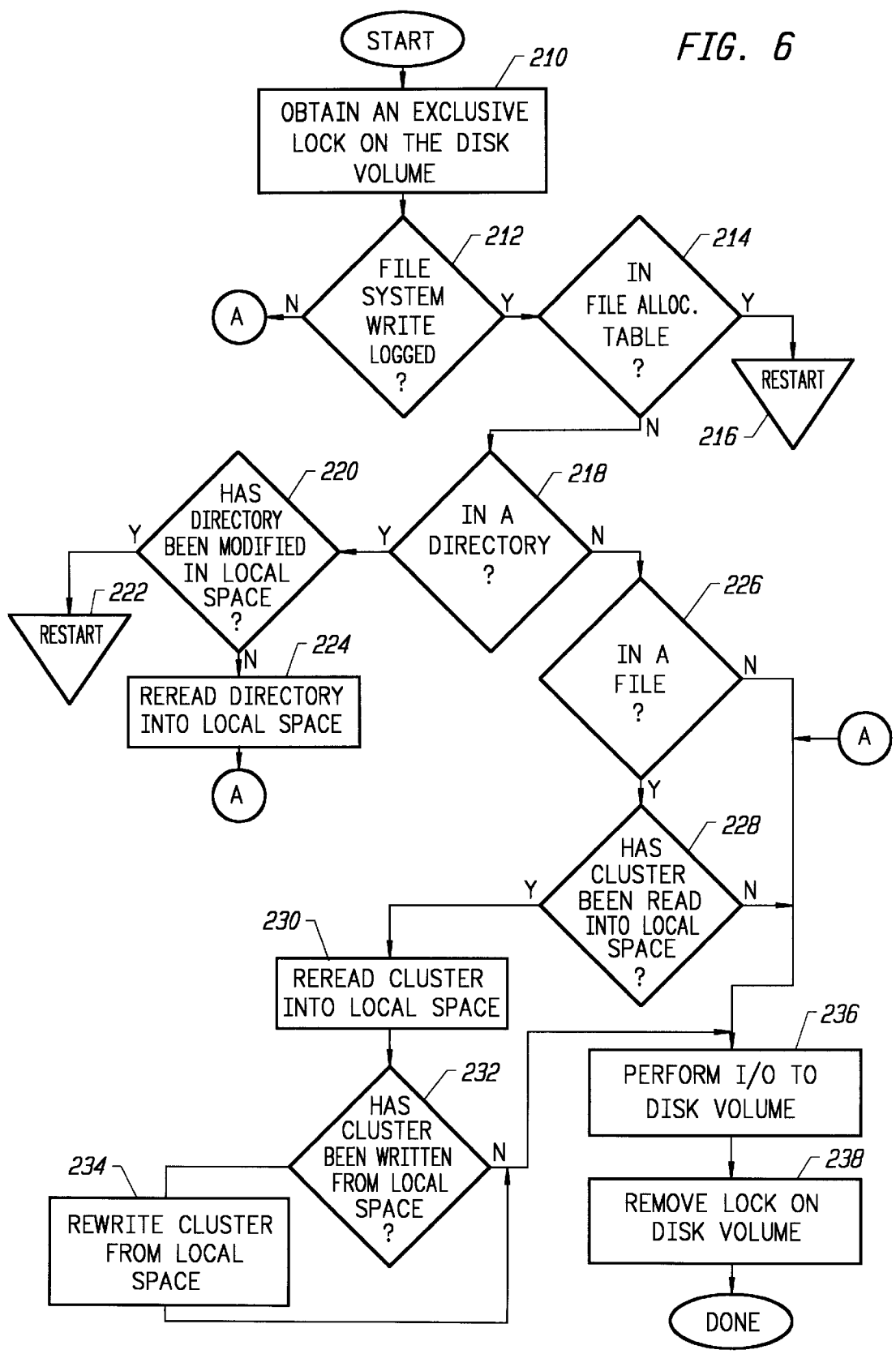
FIG. 6 illustrates the logic implemented in the disk utility application for handling file system writes to a disk volume.

FIG. 6 illustrates the logic implemented in the disk utility application 60 for handling file system writes to a disk volume on the disk drive 16. At block 210, the disk utility application 60 obtains an exclusive lock on a logical volume contained on the disk drive 16. In one embodiment, the exclusive lock is obtained from the operating system and is a level 3 lock provided by Windows 95. The exclusive level 3 lock obtained at block 210 prevents writes to the disk drive 16 other than direct writes by the disk utility application 60 through the input/output supervisor 74. Once the level 3 lock is obtained, the operating system prevents any write operation to the locked logical volume from succeeding.

Thereafter, at decision block 212 the disk utility application 60 determines whether the disk write monitor 82 has logged any file system writes to the logical volume on the disk drive 16. If a file system write is not logged at decision block 212 then control proceeds to block 236 to perform the particular input/output operation to the logical volume on the disk drive 16 as required by the disk utility application 60. Otherwise, control proceeds to decision block 214.

The logic illustrated in blocks 214–232 is repeated for each file system write logged by the disk write monitor 82. At decision block 214, the disk utility application 60 determines whether a file system write has been logged to the file allocation table of the logical volume. If such a write to the file allocation table is indicated at decision block 214 then control proceeds to block 216 to restart the disk utility application 60. Otherwise, control proceeds to decision block 218.

At decision block 218, the disk utility application 60 determines whether a file system write has been logged to a directory on the logical volume on the disk drive 16. If a file system write to a directory is detected at decision block 218 then control proceeds to decision block 220. At decision block 220, the disk utility application 60 determines whether the particular directory has been copied from the disk volume into the local memory space in the physical memory 14 and modified in local memory space. It the directory has been modified in local memory space at decision block 220 then control proceeds to block 222 to restart the disk utility application. Otherwise the file system write to the directory is deemed significant but not significant enough to require a restart and so control proceeds to block 224.

At block 224, the disk utility application 60 rereads the directory corresponding to the logged file system write and stores the directory data back into the physical memory 14 to refresh the local memory copy. Control then proceeds to block 236 to perform the particular input/output operation to the logical volume as required by the disk utility application 60.

At decision block 218, if a file system write to a directory is not detected then control proceeds to decision block 226. At decision block 226, the disk utility application 60 determines whether a file system write has been logged to a file on the logical volume of the disk drive 16. The disk utility application 60 detects file system writes to a file by comparing the cluster identifier for the file system write obtained from the file system write log 142 with the information contained in the local copies of the file allocation table and directory structure.

If a file system write to a cluster of a file is detected at decision block 226 then control proceeds to decision block 228. At decision block 228, the disk utility application 60 determines whether the cluster written by the file system has been read and copied into the physical memory 14. The cluster has been read if the cluster identifier logged with the file system write is contained in an entry of the cluster read list 34. If the particular cluster has not been read into the physical memory 14 then the file system write to that cluster is deemed inconsequential and control proceeds to block 236. Otherwise control proceeds to block 230. At block 230, the disk utility application 60 rereads the particular cluster into the physical memory 14 to refresh the local memory copy.

Thereafter at decision block 232, the disk utility application 60 determines whether the cluster has been written from local space in the physical memory 14 to the logical volume on the disk drive 16. The cluster has been written if the cluster identifier of the logged file system write is contained in an entry of the cluster write list 32.

If the cluster has been written at decision block 232 then control proceeds to block 234. At block 234, the disk utility application 60 rewrites the cluster from the local memory space in the physical memory 14 to the logical volume on the disk drive 16. Thereafter control proceeds to block 236.

At block 236, the disk utility application 60 performs the particular input/output operation to the logical volume on the disk drive 16. At block 238, after all the logged file system writes have been processed, the disk utility application 60 removes the exclusive lock on the logical volume on the disk drive 16.

Figure 7:
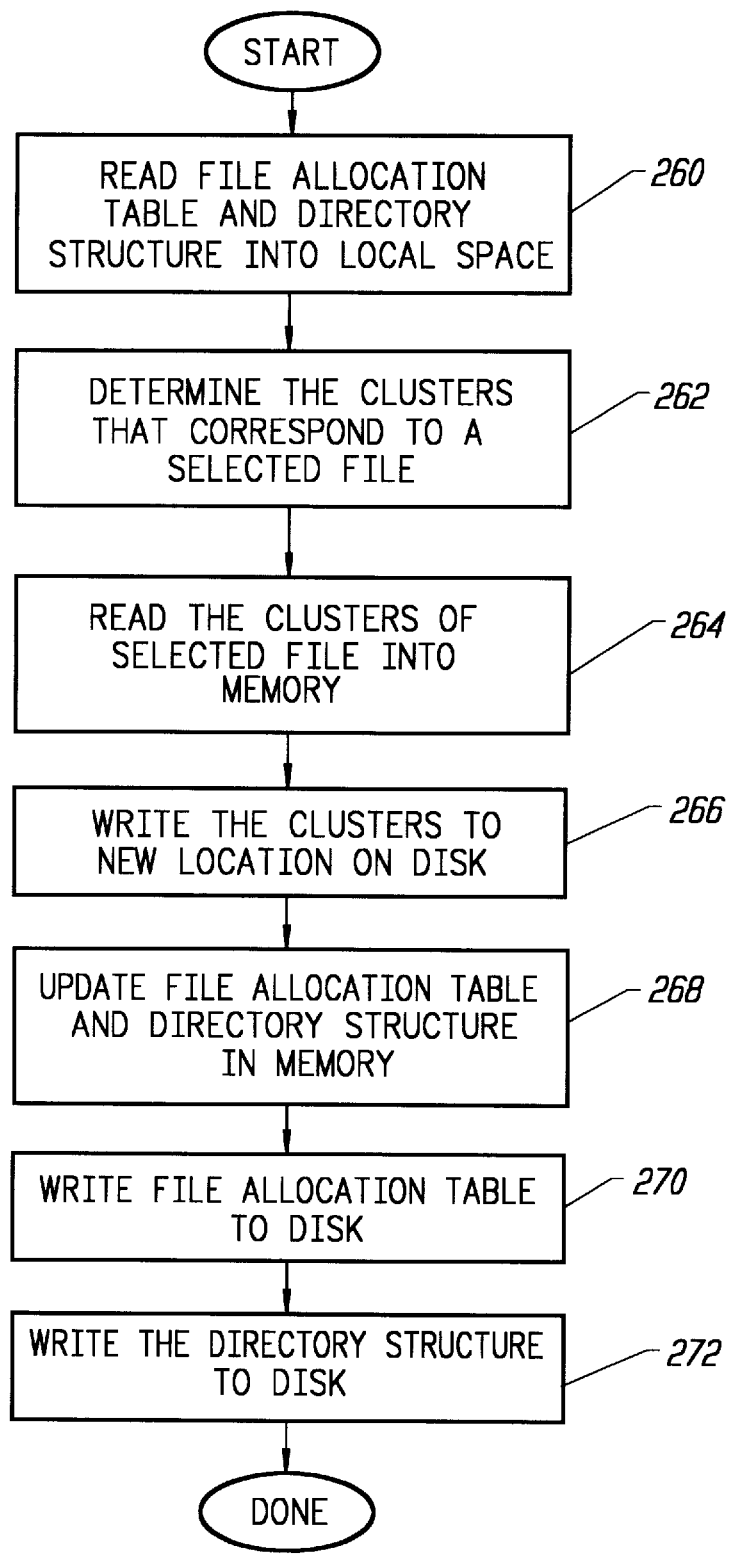
FIG. 7 illustrates the functions of the disk utility application in an embodiment that provides a defragmentation utility.

FIG. 7 illustrates the functions of the disk utility application 60 in one embodiment that provides a defragmentation utility. The disk utility application 60 proceeds to block 260 at startup of the disk utility application 60 and upon a restart of the disk utility application 60 at either block 216 or 222.

At block 260, the disk utility application 60 reads the file allocation table and directory structure from the disk volume on the disk drive 16 into a local space in the physical memory 14. Thereafter, at block 262 the disk utility application 60 determines the clusters that correspond to a particular selected file for defragmentation. At block 264 a disk utility application 60 reads the clusters of the selected file into the physical memory 14 and thereafter at block 266 writes the clusters from the physical memory 14 to contiguous clusters on the logical volume on the disk drive 16. Such cluster reads and writes are logged in read and write cluster lists 34 and 32, respectively. During such cloning operations, the disk utility application 60 periodically performs the logic set forth in blocks 210–238 above.

At block 268, the disk utility application 60 updates the file allocation table and directory structure contained in local space in the physical memory 14. At block 270, the disk utility application 60 writes the file allocation table to the logical volume on the disk drive 16 and then at block 272 writes the directory structure to the logical volume on the disk drive 16.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A method for handling a file system write to a media during execution of a software utility for the media, comprising the steps of:

reading at least one file structure from the media and storing the file structure into a local copy of the file structure;

detecting the file system write to the media and logging a set of parameters for the file system write;

determining whether the parameters indicate that the file system write is consequential, requiring a software utility restart.

2. The method of claim 1, wherein the file structure is a file allocation table contained on the media.

3. The method of claim 2, wherein the step of determining whether the parameters indicate that the file system write is consequential includes the step of restarting the software utility if the file system write targets the file allocation table on the media.

4. The method of claim 1, wherein the file structure is a directory contained on the media.

5. The method of claim 4, wherein the step of determining whether the parameters indicate that the file system write is consequential includes the steps of:

rereading the directory from the media into the local copy if the file system write targets the directory on the media and if the software utility has not modified the local copy of the directory;

restarting the software utility if the file system write targets the directory on the media and if the software utility has modified the local copy of the directory.

6. The method of claim 1, wherein the file structure is a file contained on the media.

7. The method of claim 6, wherein the step of determining whether the parameters indicate that the file system write is consequential includes the steps of:

rereading the file from the media into the local copy if the file system write targets the file on the media and if the software utility has read the file into the local copy of the file;

rewriting the file to the media from the local copy if the file system write targets the file on the media and if the software utility has written the file from the local copy of the file.

8. An apparatus for handling a file system write to a media during execution of a software utility for the media, comprising:

means for reading at least one file structure from the media and storing the file structure into a local copy of the file structure;

means for detecting the file system write to the media and logging a set of parameters for the file system write;

means for determining whether the parameters indicate that the file system write is consequential, requiring a software utility restart.

9. The apparatus of claim 8, wherein the file structure is a file allocation table contained on the media.

10. The apparatus of claim 9, wherein the means for determining whether the parameters indicate that the file system write is consequential includes means for restarting the software utility if the file system write targets the file allocation table on the media.

11. The apparatus of claim 8, wherein the file structure is a directory contained on the media.

12. The apparatus of claim 11, wherein the means for determining whether the parameters indicate that the file system write is consequential comprises:

means for rereading the directory from the media into the local copy if the file system write targets the directory on the media and if the software utility has not modified the local copy of the directory;

means for restarting the software utility if the file system write targets the directory on the media and if the software utility has modified the local copy of the directory.

13. The apparatus of claim 8, wherein the file structure is a file contained on the media.

14. The apparatus of claim 13, wherein the means for determining whether the parameters indicate that the file system write is consequential comprises:

means for rereading the file from the media into the local copy if the file system write targets the file on the media and if the software utility has read the file into the local copy of the file;

means for rewriting the file to the media from the local copy if the file system write targets the file on the media and if the software utility has written the file from the local copy of the file.

15. A computer readable medium having a set of instructions stored therein, which when executed by a computer, causes the computer to handle a file system write to a media during execution of a software utility for the media by performing the steps of:

reading at least one file structure from the media and storing the file structure into a local copy of the file structure;

detecting the file system write to the media and logging a set of parameters for the file system write;

determining whether the parameters indicate that the file system write is consequential, requiring a software utility restart.

16. The computer readable medium of claim 15, wherein the file structure is a file allocation table contained on the media.

17. The computer readable medium of claim 16, wherein the instructions for determining whether the parameters indicate that the file system write is consequential includes instructions for restarting the software utility if the file system write targets the file allocation table on the media.

18. The computer readable medium of claim 15, wherein the file structure is a directory contained on the media.

19. The computer readable medium of claim 18, wherein the instructions for determining whether the parameters indicate that the file system write is consequential includes instructions for:

rereading the directory from the media into the local copy if the file system write targets the directory on the media and if the software utility has not modified the local copy of the directory; and restarting the software utility if the file system write targets the directory on the media and if the software utility has modified the local copy of the directory.

20. The computer readable medium of claim 15, wherein the file structure is a file contained on the media.

21. The computer readable medium of claim 20, wherein the instructions for determining whether the parameters indicate that the file system write is consequential includes instructions for:

rereading the file from the media into the local copy if the file system write targets the file on the media and if the software utility has read the file into the local copy of the file; and rewriting the file to the media from the local copy if the file system write targets the file on the media and if the software utility has written the file from the local copy of the file.

22. A method for handling a file system write to a media during execution of a software utility for the media, comprising the steps of:

starting execution of said software utility, including reading at least one file structure from the media and storing the file structure into a local copy of the file structure;

detecting the file system write to the media and logging a set of parameters for the file system write;

periodically, during said execution of said software utility, polling said set of parameters, by said software utility, and determining whether the parameters indicate that the file system write is to a file allocation table, whether the parameters indicate the file system write is to a directory, and whether the file system write is to a file;

restarting said software utility if the file system write targets the file allocation table;

rereading the directory from the media into the local copy if the file system write targets the directory on the media and if the software utility has not modified the local copy of the directory;

restarting the software utility if the file system write targets the directory on the media and if the software utility has modified the local copy of the directory;

rereading the file from the media into the local copy if the file system write targets the file on the media and if the software utility has read the file into the local copy of the file;

rewriting the file to the media from the local copy if the file system write targets the file on the media and if the software utility has written the file from the local copy of the file.

23. An apparatus for handling a file system write to a media during execution of a software utility for the media, comprising:

a media utility that during execution performs a utility operation on a storage media that includes reading at least one file structure from the media and storing the file structure into a local copy of the file structure;

a write monitor that traps write accesses to the storage media during media utility execution and logs said write accesses in a write log;

said media utility periodically polling said write log and determining if said write accesses are consequential to an executing operation, and if consequential, executing a restart of said executing operation.

24. The apparatus of claim 23, wherein said write accesses are consequential if they are write accesses to a file allocation table.

25. The apparatus of claim 23, wherein said write accesses are consequential if they are write accesses to a directory.

26. The apparatus of claim 23, wherein said write accesses are consequential if they are write accesses to a directory and if the media utility has not modified a local copy of said directory.

27. The apparatus of claim 23, wherein said utility operation is a file recovery operation.

28. The apparatus of claim 23, wherein said utility operation is a file defragmentation operation.

* * * * *